United States Patent [19]

Gurevich et al.

[11] 4,132,339

[45] Jan. 2, 1979

[54] METHOD OF MAKING PIPE STRINGS AND AUTOMATIC LINE FOR REALIZING SAME

[75] Inventors: Vladimir Z. Gurevich, Moscow; Anatoly A. Prashin, Taganrog; Vyacheslav P. Stoyakin, Rostov-na-Donu; Sergei M. Ter-Minosian, Taganrog; Valery A. Frolov, Rostov-na-Donu; Viktor S. Tolstykh, Rostov-na-Donu; Vasily V. Bogansky, Rostov-na-Donu; Gennady V. Ivanenko, Rostov-na-Donu, all of U.S.S.R.

[73] Assignees: Vsesojuzny Proektno-Konstruktorsky Tekhnologichesky Institut Atomnogo Mashinostroenia, Rostov-na-Donu; Taganrogsky Zavod Krasny Kotelschik, Taganrog, both of U.S.S.R.

[21] Appl. No.: 739,813

[22] Filed: Nov. 8, 1976

[51] Int. Cl.² ............................................. B23K 31/06
[52] U.S. Cl. ................................. 228/103; 29/33 D; 29/407
[58] Field of Search .................. 29/157 R, 403, 407, 29/33 D, 33 T; 228/103

[56] References Cited

U.S. PATENT DOCUMENTS

| 3,762,624 | 10/1973 | Sprung | 228/103 X |
| 3,886,651 | 6/1975 | Vernik et al. | 29/407 X |

Primary Examiner—Al Lawrence Smith
Assistant Examiner—K. J. Ramsey
Attorney, Agent, or Firm—Fleit & Jacobson

[57] ABSTRACT

A method of making a pipe string from separate pipes of arbitrary length welded end to end wherein the joints are positioned off forbidden zones. A reference model of the pipe string having the forbidden zones marked thereon and a working model of the arbitrary pipe lengths arranged in random sequence so as to exceed the length of the desired pipe string are prepared, and by shifting the working model with respect to the reference model, a mutual arrangement is found where all pipe joints lie off the forbidden zones marked on the reference model and the excess portions of the beginning and trailing pipe lengths which are to be cut off determined. An automatic line for measuring the pipe lengths, storing measured pipes, welding the pipe lengths together, and cutting off the excess parts in accordance with the working model is used to make the pipe string. A computing device for calculating a working model of the pipe string is also disclosed.

3 Claims, 8 Drawing Figures

METHOD OF MAKING PIPE STRINGS AND AUTOMATIC LINE FOR REALIZING SAME

This invention relates to production of long strings made of separate pipes, that is stock pipes of various length and, in particular, to methods of joining pipe strings and automatic lines for realization of such methods wherein places of junction (further on referred to as joints) of the pipes used are admissible in certan places of the ready string only.

The invention can be employed in various branches of industry, e.g. in ship building for joining the ship hull skin made of separate sheets, in oil industry in construction of pipe lines, in boiler building for manufacturing elements of the heat exchange equipment, e.g. coiled pipes of various length, etc.

There is known a method for production of pipe strings from pipes of different length described in "Energomashinostroyenie" magazine No. 9, 1963, p. 33.

This method is based on that a string is collected from pipes which length is known in advance in such a way that chosen pipes do not form joints in forbidden zones of the ready string, when joined in the selected sequence.

This method is realized as follows. Stock pipes designed for making a string are at first sized by preliminary measuring the length of each pipe. Then pipes of one length are loaded one by one or in batches into a special storage, e.g. a mechanized pipe rack, where they are kept in the course of the entire process of string joining. Pipes of different lengths are similarly kept in other similar storages. When stock pipes are thus sized, the next operation of the known method is started, which is known as selection of pipe lengths for a string from the stock.

In this case on the basis of the predetermined length of a pipe string to be produced and portions marked along its length where joints can be located an operator or special devices select one by one from the known pipe lengths available in storages such pipes which joints do not come within forbidden zones. Each pipe is selected to be put into a string by analyses of all stock pipe lengths and these selection cycles for each next pipe in the string are repeated until the predetermined length is completed, after which the pipes are welded in the sequence of their selection.

The known method is deficient in that pipe strings joining involves in this case labour consuming and complicated operations such as: measuring and sizing stock pipes, storage of pipes of each length in the course of the entire process of string making, delivery at any moment of a pipe of a needed length. This makes the production process of such method too complicated, since each of the forementioned operations require respective technological equipment. The method is not economical, that is the pipe utilization factor is low, which is one more of its drawbacks.

This is accounted for by the fact that, if a next pipe length from the stock cannot be selected from the known lengths so that its joint is off the forbidden zone, a part of said pipe is cut off and it cannot be used further on in pipe string making.

There are known automatic lines for making pipe strings of pipes of different lengths for realization of the known method. There is known, for example, an automatic line for making coiled pipes from pipe strings described in the USSR Author's Certificate No. 842,777/25-27, Cl.B21d 11/06.

This automatic line comprises: a bunker for loading stock pipes, a device for measuring the real length of pipes, a device for pipe sizing made as a multistage rack featuring sections for pipes of certain lengths, a conveyer to deliver pipes of the same length to a respective section of the device for pipe sizing, a pipe cutter, live rollers to carry pipes and strings, a welding device to weld pipes into a string and a programming unit for delivering pipes of the required length for the pipe string to be produced.

A pipe string is produced by means of said automatic line as follows. The pipes from the stock bunker are supplied to the device for measuring their real length. From there pipes are fed one by one to the conveyer placing a pipe of each certain length in a respective section of the pipe sizing device. On the command of the programming unit pipes are delivered from these sections of such length and in such sequence as set in advance by the operator.

Pipes whose length is in excess of the predetermined one are cut by the pipe cutter to the required length. Then the pipes are welded into a string by means of the welding device. There is known, for example, a device for selection of pipes for a pipe string to produce coiled pipes, which is described in the USSR Author's Certificate No. 284,888 Cl.B21 11/06. It comprises a screen on which investigated lengths of pipes are shown as parallel luminous strips, their lengths being proportional in a smaller scale to pipe lengths, These representations of pipe lengths on the screen have a common origin which is a vertical line. Said device also comprises a transparent plotting board with an involute of the coiled pipe, the zones forbidding joints being marked as stripes perpendicular to the lengths of investigated pipes, and a plotting board with guide lines parallel to joint forbidding zone lines. The guide lines are spaced at intervals correspondng to the intervals between stripes designating joint forbidding zones. The screen with the investigated pipes shown thereon is matched with the plotting board whereon zones forbidding location of joints are marked so that the vertical line which is the beginning of the pipes shown on the screen coincides with the beginning of the coil pipe involute. In this case some stripes forbidding location of a joint intersect all luminous lengths of pipes shown on the screen, thus visually demonstrating which of the pipes ends are within forbidden bands and, consequently, cannot be used at the start of selection. One of the pipe lengths satisfying the requirements is chosen and marked by a respective guide line shown on the plotting board which indicates on the coil pipe involute shown on the plotting board a section of the selected portion of the pipe string and a section lacking to the next forbidden zone. Further on a second pipe is similarly chosen visually, then a third pipe, etc. They are added to the previous portions of the selected pipe string until a pipe string of the required length is obtained.

There are also known devices for measuring the real length of moving products. There is known, for example, an apparatus featuring a "floating" base for measuring the real length of moving products (cf. for example, the CSSR Pat. No. 109,301, Cl.01b). This apparatus comprises a base metering device equipped with "n+1" photoelectric pickups spaced at intervals equal to a unit of length (1 m for example) along the live rollers. Said device is also equipped with an electronic switch and a totalizing meter forming a coarse metering channel to determine the "floating" base. In addition to the base metering device the apparatus comprises a device for measuring the excess over the base length composed of a clock pulse generator, two totalizing meters equipped with switches controlled by the photoelectric pickups of the base metering device.

When the front butt of a pipe reaches the "zero" photoelectric pickup which is the first of the set of pickups spaced in the direction of the pipe movement, the switch of the coarse metering channel is opened and, as the pipe moves past rest pickups, and shuts them off by its front butt, pulses are produced and fed through said switch to the totalizing meter. When the rear butt of the pipe passes past the "zero" photoelectric pickup, this switch is closed and the first switch of the fine metering device is opened.

The pulses of the clock pulse generator are supplied through said switch to the first meter of the fine metering device while the rear butt of the pipe passes from the "zero" photoelectric pickup to the first of the next pickups. When the rear butt of the pipe passes past the "zero" photoelectric pickup and at the moment the front butt of the pipe, shuts off the next photoelectric pickup, the second switch of the fine metering device opens and pulses are fed therethrough to the second meter while the rear butt of the pipe moves to the first pickup. The pulses are fed from the coarse and fine metering devices to the digital display of the operator.

This known automatic line for joining pipe strings realizing forementioned method possesses all disadvantages inherent to said method. Besides, its manufacturing involves great technological and constructional difficulties, which makes it expensive, since it comprises such complicated production equipment as a pipe sizing device made as a multistage rack featuring sections for pipes of each particular length, a conveyer carrying pipes from one stage to another and placing them in respective sections. These components of the line, as well as pipe sizing operations, storage of pipes and their transfer to further operations make the production process layout complicated and the cycle of the pipe string and coil pipe manufacturing much longer.

Low efficiency is also a serious disadvantage of the known device for selection of pipes into a string for pipe coils, because the entire process of selection of the required pipes for a string to be joined is performed by an operator. One more disadvantage of the known device is that it excludes the possibility to automate the process of joining pipe strings.

The disadvantage of the forementioned known device for measuring the real length of moving pipes is its low efficiency, since measuring of any length requires a period of time for the pipe to pass the way equal to its real length. One more disadvantage of the known device is that it is bulky and large, because its length is twice that of any measured pipe. This is explained by the fact that at the beginning of measuring the pipe should shut off the "zero" pickup by its butt. At this moment the whole pipe is outside the zone of pickups of the device.

At the end of measurement said pipe should pass the first photoelectric pickup by its rear butt, that is at this moment the whole pipe is to be within the pickup zone of the device.

It is an object of this invention to provide such a method for joining pipe strings from pipes of nonuniform length, which is performed by the use of an uncomplicated production process layout, ensures possibilities for complete automation and permits economic use of pipes in production process and development of such an automatic line that can ensure complete automation of the method realized thereby, high efficiency and uncomplicated design.

This object is achieved by that in a method for making pipe strings from separate pipes of an arbitrary length by butt joining these pipes one by one so that these joints are positioned off forbidden zones, at first, according to the invention, a model of a reference pipe string is manufactured, its length being exactly equal to the predetermined length of a pipe string to be made, and joint forbidden zones are marked thereon; then a model of an arbitrary pipe string is prepared, wherein the real lengths of available pipes are arranged irrespective of their length in a random sequence, the total length of said model being in excess of the length of the reference pipe string; after that the model of the arbitrary pipe string is compared to the model of the reference pipe string and by shifting one with respect to the other, at the expense of the arbitrary pipe string being longer than the reference pipe string, a mutual arrangement is found, where all pipe joints in the arbitrary pipe string lie off the forbidden zones thus demonstrating a model of a pipe string of the predetermined length to be produced, the real pipes being joined thereafter according to thus obtained model.

The advantages of this method are that it raises the pipe utilization factor, simplifies the production process of making pipe strings from pipes of nonuniform length by excluding sizing of available pipes, storage of pipes of particular length and delivery at any moment of a pipe of a required length.

This object is also achieved by that an automatic line for realization of this method comprising:

the following components arranged in the sequence corresponding to the production process: a bunker for loading available pipes, equipped with a drive for delivering pipes one at a time to a device for measuring the real length of pipes provided with a coarse metering unit comprising photoelectric pickups spaced along the pipe at intervals equal to a unit of length and a fine metering unit, a welding device for welding pipes into a string, a pipe cutter provided with a stop and a drive to set said stop to the length to be cut, live rollers to carry pipes and pipe strings, comprises, according to the invention, a storage of measured pipes constituting an arbitrary string provided with a drive to dispose of unused pipes, which is placed in the sequence of the production process after the device for measuring the real length of pipes, and a computing device to calculate the pipe string to be made, which two inputs are connectd to the device for measuring the real length of pipes and its three outputs are connected respectively to the bunker drive, the storage drive and the drive of the stop setting device of the pipe cutter, whereas the unit for fine metering the length of the measured pipe of said device for measuring the real length of pipes comprises a differentiating organ built around OR circuit, its each input being connected to a respective photoelectric pickup and an electronic switch effecting the beginning and the end of the fine metering of said pipe, its inputs being connected to the outputs of the differentiating organ and to the output of the pulse pickup coupled to the metering roller running along the pipe.

It is advisable that the differentiating organ of the unit for fine metering the length of the pipe being measuring of the automatic line be made of separate elements, their number being equal to the number of photoelectrical pickups and each comprising two differentiating circuits which shape pulses of opposite polarities, the input of each element is connected to a respective photoelectric pickup, whereas the outputs of all differentiating circuits which shape pulses of one polarity are joined and coupled to one input of the electronic switch, the outputs of all differentiating circuits which shape pulses of the other polarity are also joined and coupled to the other input of the electronic switch.

The electronic switch of the automatic line may comprise a series-connected biased flip-flop, its input being coupled to one output of the differentiating organ, an AND circuit, an inverter, a flip-flop and an inhibitor circuit composed of two series-connected logical NOT circuits, a first circuit and a second circuit, the complementing inputs of said flip-flop being joined and coupled to the other output of the differentiating organ and the reset input being coupled to the output of the inverter, the outputs of the flip-flop are respectively connected to the second input of the AND circuit and the second input of the second NOT circuit, which output is the output of the inhibitor circuit and at the same time the output of the entire pipe length fine metering unit.

The computing system for calculation of a pipe string to be made in the automatic line can be made as an arithmetic unit, some inputs of said unit being coupled via a working store to an initial data input unit comprising: an input module of coarse metering data and an input module of fine metering data on the length on the pipe being measured, which are coupled to the device for measuring the real length of pipes, and an input module of reference pipe string data, other inputs of said unit are coupled to a permanent store holding subroutines of individual operations of the method for calculation of a model of a pipe string to be made, some outputs of the arithmetic unit are connected via the working store to its inputs and other outputs of said unit are connected to three inputs of a control unit, its one output being coupled to the drive for item-by-item delivery of pipes from the bunker containing available pipes and another being coupled to the drive of the storage for disposal of unused measured pipes of the arbitrary pipe string and the third output being coupled to the drive for stop setting to the length of the pipe portion being cut of the arbitrary pipe string of the pipe cutter.

The advantage of the invention consists in the fact that it can be realized with the help of uncomplicated technical facilities.

One more advantage of this invention as compared to the known devices consists in that it becomes possible to completely automate the process of making long pipe strings and attain high pipe utilization factor in industrial production.

The invention will now be described in greater detail with reference to a specific embodiment thereof, taken in conjunction with the accompanying drawings, wherein.

The claimed method of making pipe strings from pipes of nonuniform length is realized as follows.

At first a model of a reference pipe string is prepared. This model may be prepared in any suitable manner, for instance, graphically, in the form of a mock-up, or in the form of a table with the data about the absolute lengths of the alternating sections permitting or forbidding the arrangement of joints as to the length of a pipe string being manufactured.

Figure 1:
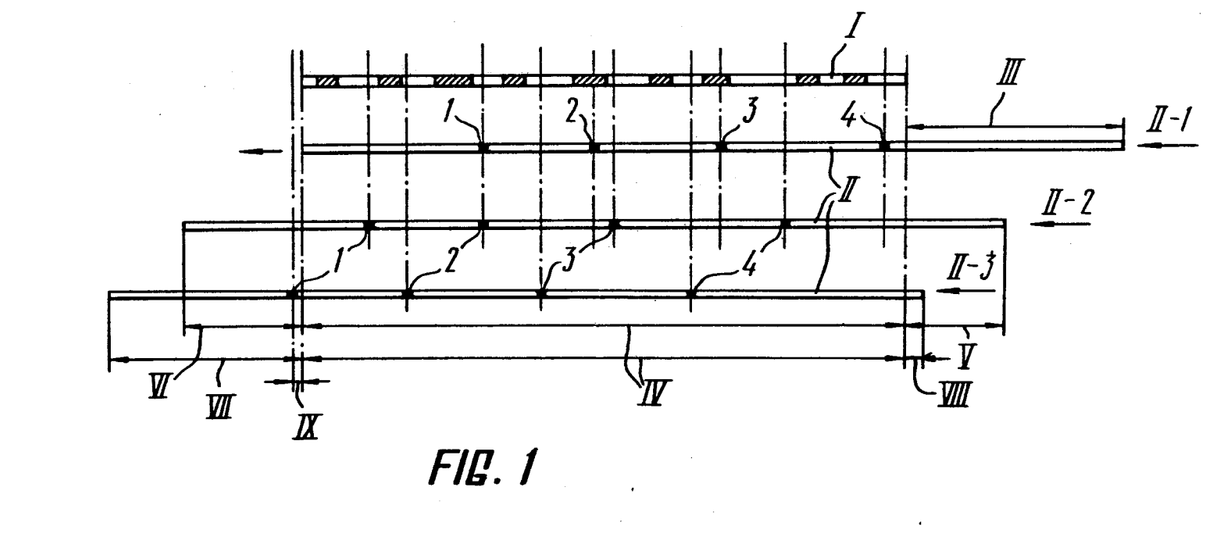
FIG. 1 shows a schematic of:
a model I of a reference pipe string;
a model II of an arbitrary pipe string;
variations II-1, II-2, II-3 of the mutual arrangement of the model II of an arbitrary pipe string with respect to the model I of the reference pipe string explanatory of the method of joining pipe strings, according to the invention.

To simplify the description of the method, model I of FIG. 1 presents graphically the reference pipe string, with a scale representative of the absolute length of the pipe string being manufactured and has a length $L_1$ exactly equal or corresponding to the predetermined length of a pipe string to be produced. Zone graphically representing areas where joints are forbidden in the pipe string are marked on the model (shown as crosshatched portions in FIG. 1). Then, initial or available pipes are taken at will and by the actual length thereof is developed graphical model II of the artitrary pipe string in the same scale as the model I. In this case the length $L_2$ of the model II of an arbitrary pipe string is chosen so as to exceed the length $L_1$ of the model I of the reference pipe string by the length $L_3$ of a portion III. The length $L_3$ of the portion III in realization of this method is not limited and can even exceed the length $L_1$ of the model I of the reference pipe string.

Then joints of the real lengths of available pipes are shown in the length $L_2$ of the model II of the arbitrary pipe string (shown as black portions in FIG. 1).

In the concrete example of FIG. 1 the model II of the arbitrary pipe string is composed of five pipes and has four joints 1, 2, 3, 4.

After that the model I of the reference pipe string is compared to the model II of the arbitrary pipe string, which in this embodiment is placed in the position II-1 and at the same time all joints 1-4 of the pipes of the model II of the arbitrary pipe string are projected to the model I of the reference pipe string. The position of each joint of the model II of the arbitrary pipe string is marked on the model I of the reference pipe string.

In the described example of realization of this method the joints 1 and 4 fall into permitted zones, whereas the joints 2 and 3 fall into forbidden zones. The model II of the arbitrary pipe string is therefore shifted with respect to the model I at the expense of the portion III with the length $L_3$.

When shifting the model II of the arbitrary pipe string with respect to the model I of the reference pipe string, such mutual arrangement of pipe strings is to be achieved where all joints 1–4 of the model II of the arbitrary pipe string lie off the forbidden zones shown on the model I of the reference pipe string.

In the described example of realization of the method this condition is satisfied, for example, by the position II-2 of the model II of the arbitrary pipe string. It is apparent that here all joints 1–4 are off the hatched forbidden zones of the model I of the reference pipe string.

The model I of the reference pipe string is then projected onto the model II of the arbitrary pipe string, which is in the position II-2, thus obtaining a model IV of a pipe string to be made, which length is X equal to $L_1$ of the model I of the reference pipe string. At the same time portions V and VI are defined on the model II of the arbitrary pipe string, which are located on both sides of the model IV of a pipe string to be made.

But from the example of FIG. 1 it transpires that in realization of the claimed method the solution of the problem of finding the portion IV, which length is X corresponding to the length $L_1$ of the reference pipe string, by means of the model II of the arbitrary pipe string can be achieved differently.

Thus in the position II-3 of the model II with respect to the model I there is found a portion IV on the model II, which is equal in length to the model I and which joints 1–4 lie off its forbidden zones. This suggests that an optimum variation is selected of the two possible ones to be most satisfying to the industrial requirements.

In the example of FIG. 1 for making a long pipe string according to the claimed method the final selection is that of the position II-3 of the model II of the arbitrary pipe string with respect to the model I of the reference pipe string.

This is explained by a number of conditions and, in particular, by the fact that the model IV of a pipe string to be made as in the position II-3 consists of four pipes 2, 3, 4, 5 instead of five pipes 1, 2, 3, 4, 5 as in the position II-2 of the model II. In this way the selected variation II-3 reduces labour expenditure of joining the pipe string IV as compared to the variation II-2. Besides, the pipe string IV in the position II-3 has three joints instead of four as in the position II-2 and reduction of joints in long pipe strings increases their reliability when they are further used to make final products.

One more important condition in selection of an optimal variation of joining a pipe string by the claimed method is the analyses of lengths of the portions V, VI, of the model II in the position II-2 and the portions VIII, IX of the model II in the position II-3 from the standpoint of rational employment of pipes in the production process. If, for example, it is assumed that the portions V, VI in the position II-2 of the arbitrary pipe string and the portions VIII, IX in the position II-3 do not satisfy technological requirements for their repeated use in making pipe strings and are discarded as waste, the variation II-3 is again preferred to other variations because it ensures more economical use of pipes.

In a general case of realization of the claimed method there are possible such embodiments of the initial position II-1 of the model II of the arbitrary pipe string with respect to the model I of the reference pipe string, wherein said model need not be shifted because all joints of the model II of the arbitrary pipe string happen to be off the forbidden zones of the model I of the reference pipe string.

The optimal variation of joining a pipe string being selected, the final stage of joining the pipe string is started directly in the production sector. To this end the pipes 2, 3, 4, 5 of the arbitrary string II are joined according to the earlier accepted variation II-3 by welding into a pipe string in the sequence of the model IV. The excess portions VIII, IX of said pipe string are then cut off and a pipe string of the predetermined length is thus obtained, all its joints being off the forbidden zones of the ready product.

An automatic line for realization of the method of joining pipe strings from pipes of nonuniform length made according to the invention comprises: components arranged in the sequence corresponding to the production process: a bunker 5 (FIG. 2) for loading available pipes with a drive 6 for delivering pipes one at a time to first live rollers 7 of a device 8 for measuring the real length of each pipe 9, which in its turn is connected by means of second live rollers 10 to a storage 11 of measured pipes constituting an arbitrary pipe string, third live rollers 12 carrying pipes from said storage 11 to fourth live rollers 13 carrying the pipes and the string, respectively, to a welding device 14 intended for automatic butt welding of the pipes of the arbitrary pipe string and further to a pipe cutter 15 designed for automatic cutting of excess portions of the arbitrary pipe string to obtain a required pipe string and to a storage 16 of ready pipe strings. Besides, said automatic line comprises a computing system 17 for calculation of a pipe string to be made, which inputs are connected to said device 8 for measuring the real length of pipes and the outputs are connected to said bunker 5 for loading available pipes, the storage II of measured pipes and the pipe cutter 15.

Figure 2:
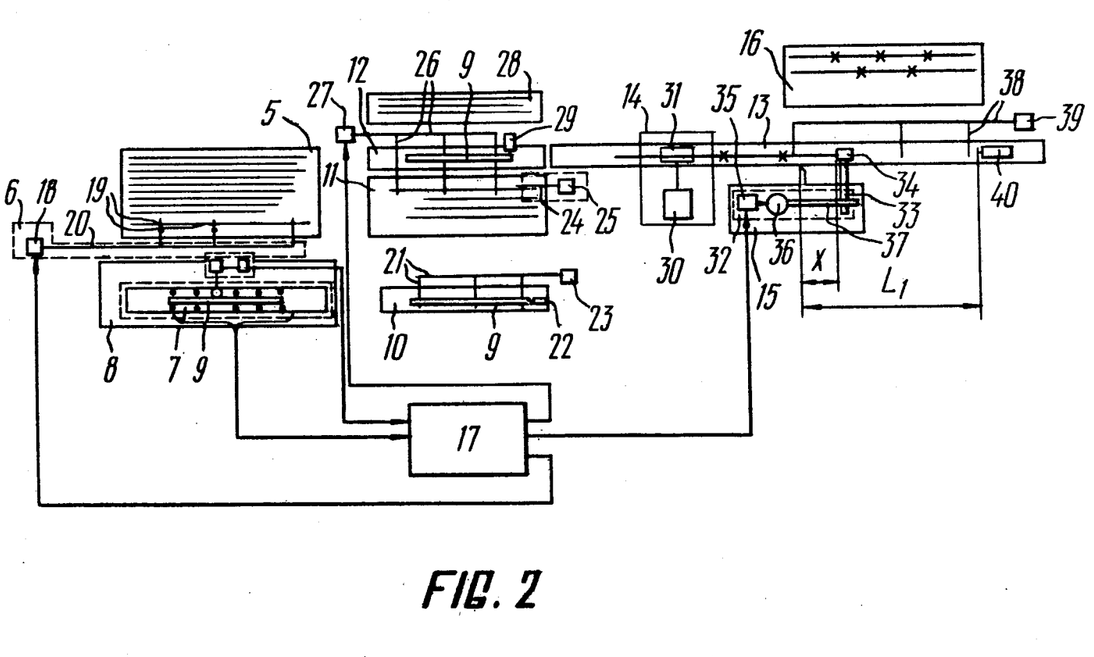
FIG. 2 shows a schematic of an automatic line for realization of the method of making pipe strings, according to the invention.

The drive 6 for item-by-item pipe delivery comprises a solenoid 18, levers 19 which rotate around an axis 20, when said solenoid 18 is cut in, and discharge the next pipe to the live rollers 7 of the device 8 for measuring the real length of pipes.

The second live rollers 10 are designed for carrying an already measured pipe from the device 8 for measuring the real length of pipes to the storage 11. They are equipped with a drive 21 for discharge of the pipe and an end switch 22 for producing commands to turn on a solenoid 23 for pipe discharge.

The storage 11 of the described line is made as a rack with one inclined ramp to roll down pipes to a stop 24 coupled to a solenoid 25. Said storage 11 is equipped with a drive 26 coupled to a solenoid 27 for discharge of unused pipes of the arbitrary pipe string into the bunker 28.

The third live rollers 12 are designed for carrying the pipes of the arbitrary pipe string from the storage 11 to the welding device 14. The third live rollers 12 feature an end switch 29 to determine the presense of a pipe thereon and to control the solenoid 25 releasing the stop 24 to discharge the next pipe from the storage 11.

The welding apparatus 14 comprises: a welding machine 30 with an automatic pipe butt welding cycle and a clamping centering device 31 for butt welding of pipes, which are widely known and described in "Contact Welding" (Vsesojuznoje uchebno-pedagogicheskoe izdatelstvo proftekhizdat, Moscow, 1962).

The pipe cutter 15 is a machine for pipe cutting with an automatic cutting cycle, which is commonly known and described in information booklets "Technology, Organization and Mechanization of Forging and Purveyance" (published by HIIInformtjazhmash, 11-72-7, Moscow, 1972).

The pipe cutting machine is equipped with a drive 32 for setting a stop 33 to the length to be cut and an end switch 34. The drive 32 comprises a programme control unit 35, a step-by-step motor 36 featuring a guide screw 37 moving said stop 33.

Said drive is widely known and described in "Step-by-step Drive in Programme control Machines" (published by NIIMash, Machine-Building series, Moscow, 1971).

The fourth live rollers 13 are designed for carrying pipes and a pipe string successively to the welding apparatus 14, then to the pipe cutter 15 and, finally, to the storage 16 of ready pipe strings. They are equipped with a drive 38 with a solenoid 39 for release of a pipe string to the storage 19 and an end switch 40 for producing commands to turn on the pipe cutter 15.

The storage 16 is made as a rack for keeping ready pipe strings.

As it has been already mentioned, the device 8 for measuring the real length of moving pipes comprises: a coarse length metering unit 41 (FIG. 3), a fine length metering unit 42, which is connected to a pulse pickup 43 coupled to a measuring roller 44 running along the the pipe 9 being measured as it moves.

Said coarse length metering unit 41 is designed for measuring on the live rollers 7 (FIG. 2) of only that portion of the pipe 9 which is divisible by a whole number of units of length. It comprises photoelectric pickups 45 (FIG. 3) arranged along the length of said live rollers 7 (FIG. 2) at intervals equal to a unit of length. The number of photoelectric pickups 45 (FIG. 3) is selected equal to n+1, where n is the maximum limit of length of pipes to be measured.

Said number of the photoelectric pickups 45 corresponds also to the number n+1 of separate outputs of the coarse length metering unit 41 connected to the input of said computing system 17 (FIG. 2).

In the described example the device 8 for measuring the real length of pipes is rated for the measuring range from three to twelve meters. The coarse length metering unit 41 (FIG. 3) comprises thirteen photoelectric pickups 45 spaced at intervals of one meter, because the maximum limit of the measuring range is equal to twelve meters.

Figure 3:
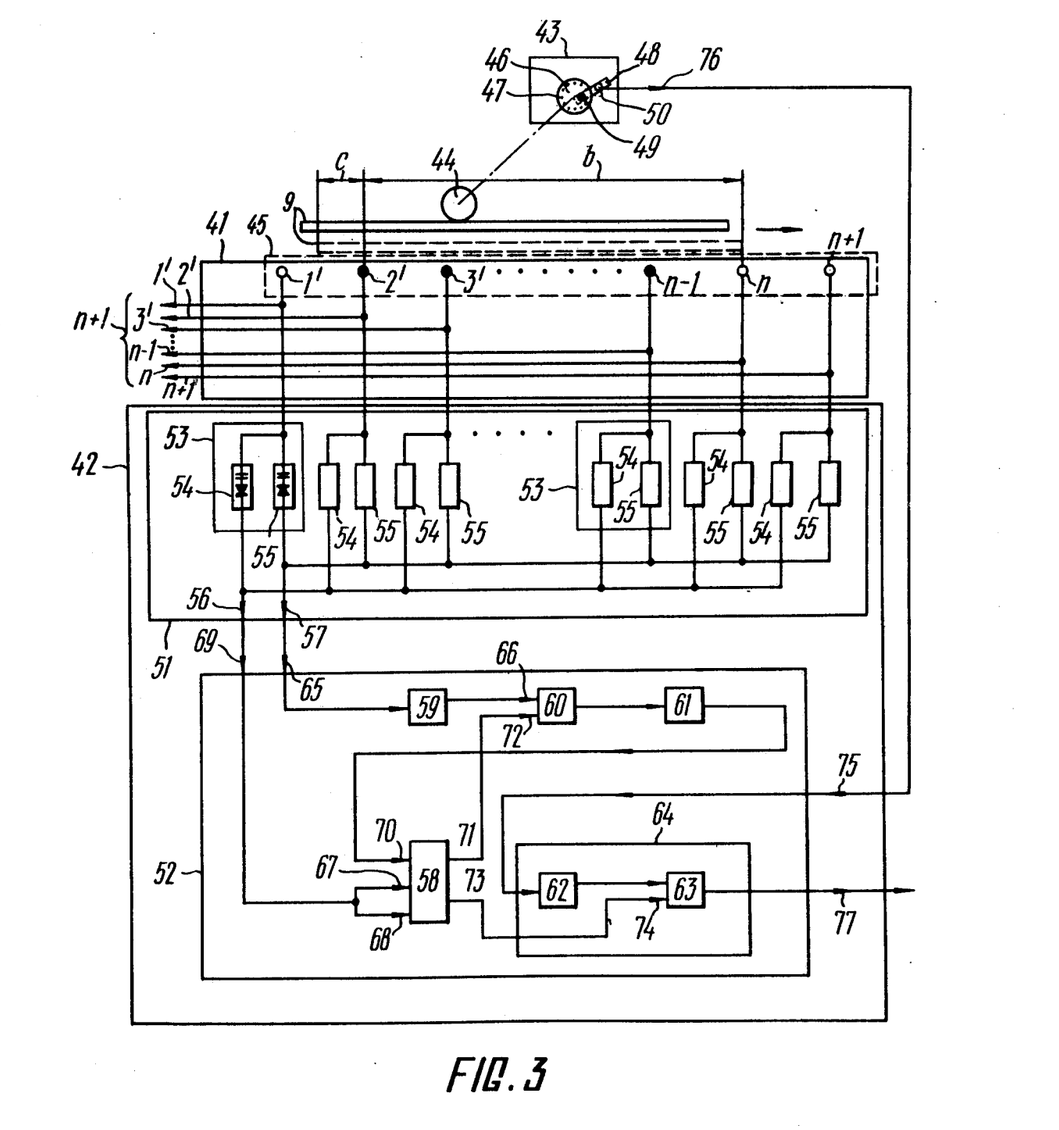
FIG. 3 shows a block diagram of a device for measuring the real length of moving pipes, according to the invention.

The pulse pickup 43 is rigidly connected by one axis to the measuring roller 44 and designed to convert the linear length of the pipe 9 being measured into a certain number of electrical pulses. It comprises: a disc 46 with holes 47 positioned circularly at uniform intervals and a photoelectric pickup 48, the number of holes 47 on the disc 46 is determined by the required accuracy of measurement.

A light 49 (shown by a black circle) and a photocell 50 (shown by a light circle) of the photoelectric pickup 48 are placed on both sides of the disc 46. In the concrete embodiment of the device 8 (FIG. 2) for measuring the real length of moving pipes the circumference of the measuring roller 44 (FIG. 3) is 360 mm and there are 360 holes 47 on the disc 46. Each electrical pulse at the output of the pulse pickup 43 corresponds, therefore, to 1 mm of the measured pipe.

The fine length metering unit 42 is designed for measuring the portion of the pipe being measured which is less than a unit of length.

Said fine length metering unit 42 comprises a differentiating organ 51 and an electronic switch 52.

The differentiating organ 51 is designed to produce signals, which are pulses of voltage of different polarity proportional to the time derivative of the value of voltages produced by the photoelectric pickups 45 of the coarse length metering unit 41 at the moment it is shut off or released by the pipe being measured. The differentiating organ 51 comprises elements 53, their number being n+1 that is equal to the number of the photoelectric pickups 45 of the length coarse metering unit 41. Each element is composed of two conventional differentiating circuits 54 and 55, one said differentiating circuit 54 produces a voltage pulse of positive polarity and the other differentiating circuit 55 produces a voltage pulse of negative polarity.

The differentiating organ 51 is at the same time a logical OR circuit featuring inputs equal in number to the number n+1 of the photoelectrical pickups 45 of the coarse length metering unit 41, each input n+1 of the logical OR circuit (51) being connected to a respective photoelectrical pickup 45 of the coarse length metering unit 41.

Each input n+1 of the logical OR circuit (51) joins the inputs of two differentiating circuits 54 and 55 of one element 53. All outputs of the differentiating circuits 54 of each element 53 are joined into one output 56 of the logical OR circuit (51). All outputs of the differentiating circuits 55 of each element 53 are respectively joined into another output 57 of the logical OR circuit (51).

The electronic switch 52 is intended for control of pulses delivered from the pulse pickup 43 to the input of said computing system 17 (FIG. 2), that is it determines the beginning and the end of the fine measurement of the length of the pipe 9. Said switch 52 (FIG. 3) comprises a flip-flop 58, a biased flip-flop 59, an AND circuit 60, an invertor 61 and two series connected NOT circuits, a first NOT circuit 62 and a second NOT circuit 63, which form together an inhibitor circuit 64. One input 65 of the switch 52 is coupled to the output 57 of the differentiating organ 51, which produces pulses of negative voltage. The biased flip-flop 59 is intended to correlate the polarity of the voltage at the output 57 of the differentiating organ 51 with the polarity of the voltage at an input 66 of the AND circuit 60, its output being coupled to the input of the invertor 61.

The flip-flop 58 is built around a circuit with a complementing input, that is two of its separate inputs 67 and 68 are joined into one input, which is a second input 69 of the electronic switch 52. Said input 69 of the electronic switch 52 is also connected to the output 56 of the differentiating organ 51 which produces voltage pulses of different polarity. A third input 70 of the flip-flop 58 is intended for resetting and coupled to the output of the invertor 61.

One output 71 of the flip-flop 58 is a second input 72 of the AND circuit 60. Another output 73 of the flip-flop 58 is coupled to a second input of the second NOT circuit 63 and is one input of the inhibitor circuit 64. The input of the first NOT circuit 62, which is another input of the inhibitor circuit 64 and at the same time the third input 75 of the switch 52, is connected to an output 76 of the pulse pickup 43. The output of the second NOT circuit 63 is the output of the inhibitor circuit 64, the output of the switch 52 and at the same time an output 77 of the entire fine length metering unit 42 and is coupled to the input of the computing system 17 (FIG. 2).

As it has already been mentioned above, the computing system 17 is intended for calculating a pipe string to be made and comprises an initial data input unit 78 (FIG. 4) composed of three separate modules 79, 80, 81.

The first module 79 is designed for input of coarse pipe length metering data and has n+1 inputs, each being connected respectively to each of the n+1 photoelectric pickups 45 (FIG. 3) of the coarse length metering unit 41 of the device 8 (FIG. 2) for measuring the real length of the pipe 9. The second module 80 (FIG. 4) is designed for input of fine pipe length metering data, its input being coupled to the output 77 (FIG. 3) of the fine length metering unit 42 of said device 8 (FIG. 2) for measuring the real length of a pipe.

The third module 81 (FIG. 4) is designed for input of the assignment to produce a pipe string put in by the operator as data on the reference pipe string recorded, for example, on a perforated tape.

Figure 4:
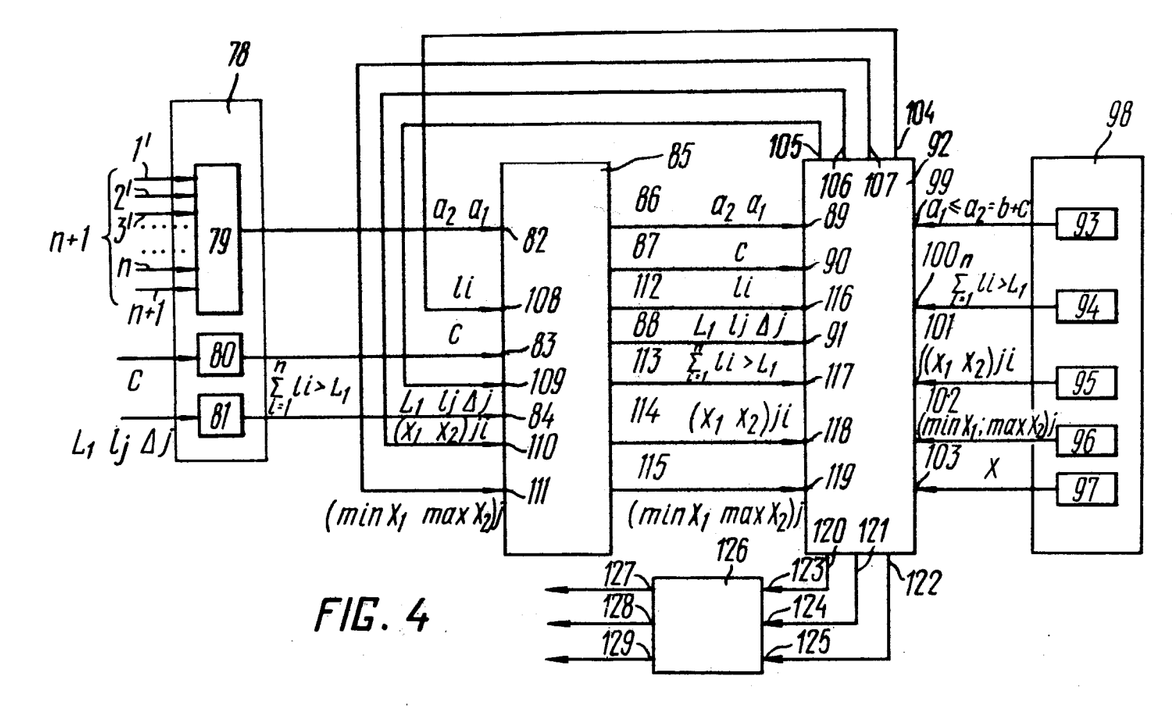
FIG. 4 shows a block diagram of a computing system, according to the invention.

The outputs of said modules 79, 80 and 81 are connected to inputs 82, 83 and 84 of a working store 85. Outputs 86, 87 and 88 of the working store 85 are intended respectively for the output of data on coarse and fine pipe length metering, as well as data on the reference pipe string and connected to respective inputs 89, 90 and 91 of an arithmetic unit 92.

Said arithmetic unit 92 performs the following operations:

analyses of the results of the coarse length metering and determination of the real pipe length;

adding of real lengths of available pipes into a model of an arbitrary pipe string;

calculation of intervals of possible shifts of each joint of the arbitrary pipe string with respect to the model of the reference pipe string;

calculation of intervals of possible shifts of all joints of the arbitrary pipe string model with respect to the reference pipe string model, in which all joints of pipes of the arbitrary pipe string model lie off the forbidden zones of the reference pipe string model;

calculation of the value of the relative shift of the reference and arbitrary pipe string models, which corresponds to an optimal mutual arrangement of models on the basis of economic pipe use.

All above mentioned operations are performed arithmetically by the unit 92 according to individual programmes recorded in modules 93, 94, 95, 96, 97 of a permanent store 98, their outputs being connected directly to respective inputs 99, 100, 101, 102, 103, of the arithmetic unit 92.

The arithmetic unit 92 has seven outputs, four of which are intended for operational exchange of data on calculation of a model of a pipe string to be made between the arithmetic unit 92 and the working store 85.

The outputs 104, 105, 106, 107 of the arithmetic unit 92 are connected respectively to inputs 108, 109, 110, 111 of the working store 85, its outputs 112, 113, 114, 115 being coupled to respective inputs 116, 117, 118, 119 of the arithmetic unit 92. Three other outputs 120, 121, 122 of the arithmetic unit 92 are designed for output of its commands and connected to respective inputs 123, 124, 125 of a control unit 126.

The control unit 126 is intended for converting commands of the arithmetic unit 92 into discrete voltage pulses to control devices of the automatic line. One output 127 of the control unit 126 is coupled to the solenoid 18 (FIG. 2) of the drive 6 for item-by-item pipe delivery from the bunker 5 containing available pipes. The other output 128 (FIG. 2) of said control unit 126 is coupled to the solenoid 27 (FIG. 2) of the drive 26 of the storage 11 of measured pipes of the arbitrary pipe string. The third output 129 (FIG. 4) of the control unit 126 is coupled to the programme control unit 35 (FIG. 2) of the drive 32 for setting the stop 33.

All said units of the foredescribed computing system (FIG. 4) are widely known and described in "Automated Control Systems for Technological Processes", Moscow, "Statistika" publishers, 1974.

The automatic line for making long pipe strings from pipes of nonuniform length operates as follows.

Before bringing into operation the automatic line for making pipe strings the following preliminary operations are performed. Available pipes, which are prepared for butt welding in advance, are loaded into the bunker 5 (FIG. 2) by, for example, a crane.

An assignment to make a required pipe string is put in the computing system 17. The assignment is put in as follows.

Data on the length of the model 1 (FIG. 1) of the reference pipe string are pre-recorded on, for example, a perforated tape as alternating pairs, each of them being composed of a portion with a length $l_j$, wherein a joint can be located and shown in FIG. 1 by unhatched sections, and a portion with a length $\Delta_j$ forbidding location of a joint and shown in FIG. 1 by a hatched section, the total length of alternating pairs being equal to the length $L_1$ of the model of the reference pipe string.

The model I of the reference pipe string of length $L_1$ is henceforth not the diagrammatical model I shown in FIG. 1, but a model of a pipe string to be made for a concrete product, a coiled pipe for example.

When an assignment to make a pipe string is completed, the data on the reference pipe string, which are recorded on the perforated tape, are introduced by an operator into the module 81 (FIG. 4) of the initial data input unit 78. Said module 81 takes the data on the model I of the reference pipe string from the perforated tape and delivers the data to the input 84 (FIG. 4) of the working store 85 as length $L_1$ of the model I of the reference pipe string and alternating zones of length $l_j$ permitting location of joints and of length $\Delta_j$ forbidding location of joints.

The end switch 40 (FIG. 2) of the live rollers 13 is placed at a distance $L_1$ (equal to the length of the pipe string to be made) from the cutting tool of the pipe cutter 15.

The line is then ready for automatic operation to make long pipe strings. The operation of the automatic line c begins by delivery of the first pipe 9 from the bunker 5 containing available pipes.

The first pipe 9 is delivered from the bunker 5 containing available pipes by the solenoid 18 of the drive 6 for item-by-item pipe delivery being remotely switched on by an operator, as well as the first and second live rollers 7 and 10 for carrying pipes.

When the solenoid 18 is switched on, the levers 19 turn around the axis 20 and push the first available pipe 9 to the first live rollers 7 of the device 8 for measuring the real length of the pipe.

The pipe 9 is measured as follows.

When the pipe 9 is pushed to the first live rollers 7, it shuts off a number of photoelectric pickups 45 (FIG. 3) of the coarse length metering unit 41.

Figure 5:
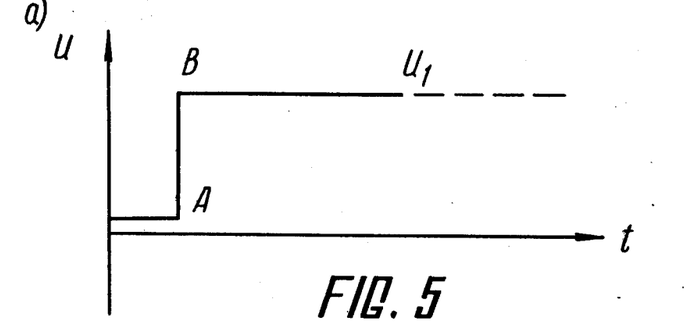
FIG. 5 shows a chart of variations of the voltage of the photoelectric pickup of the pipe length coarse metering unit at the moment, when it is shut off by the front butt of the measured pipe, according to the invention.

The number of the photoelectrical pickups 45 shut off by the pipe 9 is divisible by a whole number of units of length and in the concrete example is equal to the number of photoelectric pickups from $2^1$ to n-1 inclusive (shown by black circles in FIG. 3). It is evident that, when the pipe 9 shuts off any of the n+1 photoelectric pickups 45, it produces a voltage pulse of long duration growing from the point A to point B (FIG. 5). Said voltage pulses from all photoelectric pickups positioned between the photoelectric pickup $2^1$ (FIG. 3) and the photoelectric pickup n−1, including the forementioned ones, are supplied from the respective outputs n+1 of the coarse length metering unit 41 of the device 8 (FIG. 2) to respective inputs n+1 of the module 79 (FIG. 4) of the initial data input unit 78 of the computing system 17 (FIG. 2). The coarse length metering module 79 (FIG. 4) takes the number of voltage pulses which simultaneously arrive from shut-off photoelectric pickups of the coarse length metering unit 41 (FIG. 3) and this information is fed to the input 82 (FIG. 4) of the working store as a number $a_1$ of shut-off photoelectric pickups.

This is the way the first coarse measurement of the pipe 9 (FIG. 3) is done.

It is apparent that the number $a_1$ of voltage pulses simultaneously fed from the shut-off photoelectric pickups 45 (FIG. 3) of the coarse length metering unit 41 of the device 8 (FIG. 2) to the input of the module 79 (FIG. 4) of the computing system 17 (FIG. 2) constitutes only that part of the length of the pipe 9 (FIG. 3), which is divisible by a whole number of units of length.

The part of the pipe 9, which is less than a unit of length and, is measured by the fine lenght metering unit 42 operating as follows.

As previously mentioned, the voltage pulses $U_1$ (FIG. 5) of long duration produced by the photoelectric pickups 45 from $2^1$ to n−1 inclusive, which are shut off by the pipe 9 (FIG. 3), are fed simultaneously to respective inputs of the elements 53 of the differentiating organ 51 of the fine length metering unit 42. It is clear that the output of each differentiating circuit 54 produces voltage as a short pulse of positive polarity, which is the derivative $dU_1/dt$ (FIG. 6) a pulse of positive polarity of duration $\Delta t_1$) of the voltage of the photoelectric pickups 45 shut off by the pipe 9 (FIG. 3). Said signal is fed as a short voltage pulse of positive polarity from the output 56 of the differentiating organ 51 to the input 69 of the electronic switch 52.

The electronic switch 52 operates as follows.

The flip-flop 58 of the electronic switch 52 before measurement of the real length of the pipe 9 is started is in the initial condition, in which a signal in the form of a high voltage level is present at its output 73 (the signal is hence forth referred to as "I") and a low voltage level signal (henceforth referred to as "O") is present at the output 71.

With said first pulse of positive polarity applied from the output 56 of the differentiating organ 51 to the complementing input 69 of the flip-flop 58, the latter is only prepared to be set to another stable condition.

It is clear that the pipe 9 after being pushed to the live rollers 7 (FIG. 2) starts moving towards the live rollers 10. At this moment the measuring roller 44 (FIG. 3) coupled to the disc 46 of the pulse pickup 43 starts to run along the pipe 9. The disc 46 with holes 47 interrupts the beam of the light 49 and, consequently, when the beam 49 of the light is interrupted the photocell 50 of the photoelectric pickup 48 produces a short signal "I" as a high level voltage pulse. At the moment the beam of the light 49 passes through the hole 47 in the disc 46, the photocell 50 produces, respectively, a short signal "O" as a low level voltage pulse. In this way, as the pipe 9 moves, electrical pulses, which are signals "I", are fed from the output 76 of the pulse pickup 43 to the input 75 of the electronic switch 52. Said pulses are fed to the input 75 of said electronic switch 52 as a signal "I" while the measuring roller 44 runs along the pipe 9.

Since the input 75 of the electronic switch 52 is at the same time the input of the first NOT circuit 62, each signal "I" of the pulse pickup 43 is converted at its input into the signal "O" at its output.

The signal "O" is supplied from the output of the first NOT circuit 62 to one input of the second NOT circuit 63. However, at this moment, as previously mentioned, there is the signal "I" at the second input 74 of the second NOT circuit 63, which is fed from the output 73 of the flip-flop 58. The presence of the signal "I" at the output 73 of the flip-flop 58 inhibits passage of signals "I" fed from the pulse pickup 43, that is a logical inhibiting operation is performed. Thus in the process of measuring the pipe 9 in the above described position the electronic switch 52 of the fine length metering unit 42 is closed and the signals "I" from the pulse pickup 43 cannot pass to the output 77 of the fine length metering unit 42. However, as the pipe 9 (FIG. 3) moves along the first live rollers 7 (FIG. 2), its forward butt approaches the nearest of the photoelectric pickups 45 which were not shut off by said pipe 9 at the start of measurement as described above. As seen from the concrete example, the pipe 9 (FIG. 3) approaches the open photoelectric pickup n of the coarse length metering unit 41. When the forward butt of the pipe 9 shuts off the next photoelectric pickup 45 since it started moving along the first live rollers 7 (FIG. 2), said pipe 9 (FIG. 3) starts being measured simultaneously by the coarse length metering unit 41 and the fine length metering unit 42. The coarse length metering unit 41 performs a second coarse measurement of the length of the pipe 9.

As seen from the concrete example of FIG. 3, two variations are possible at the moment the forward butt of the pipe 9 shuts off the photoelectric pickup n.

According to the first variation, the number of shut-off photoelectric pickups 45 is equal to the number of the photoelectric pickups located between the pickup $2^1$ and the pickup n, including the above mentioned ones. In this case the total number of shut-off photoelectric pickups 45 is less by one than the number $a_1$ of the shut-off photoelectric pickups 45 during the first coarse measurement of the length of the pipe 9.

According to the second variation the number of shut-off photoelectric pickups 45 is equal to the number of the pickups located between the photoelectric pickup $3^1$ and the pickup n, including the above mentioned ones.

In this case the total number of shut-off pickups 45 is equal to the number a of the pickups 45 shut off during the first coarse measurement of the pipe 9.

As previously mentioned, during the second coarse measurement of the pipe 9 the number of pulses according to FIG. 5 fed from the outputs n+1 of the coarse length metering unit 41 to respective inputs n+1 of the module 79 (FIG. 4) of the computing system is equal to the number $a_2$ of the photoelectric pickups 45 (FIG. 3) shut off at moment of measuring. Information on the second coarse measurement of the length of the pipe 9 as a number $a_2$ corresponding to the number of photoelectric pickups 45 shut off at the moment of measuring is supplied from the output of the module 79 (FIG. 4) to the input 82 of the working store 85. The coarse measurement of the pipe 9 (FIG. 3) by the metering device is completed at this stage.

Fine measurement of the length of the pipe 9 by the fine length metering unit 42 is done as follows.

At the moment the forward butt of the pipe 9 shuts off the photoelectric pickup n, it produces, as mentioned above, a signal, which is the voltage supplied according to FIG. 5 to the input of the n-th element 53 of the differentiating organ 51.

Figure 6:
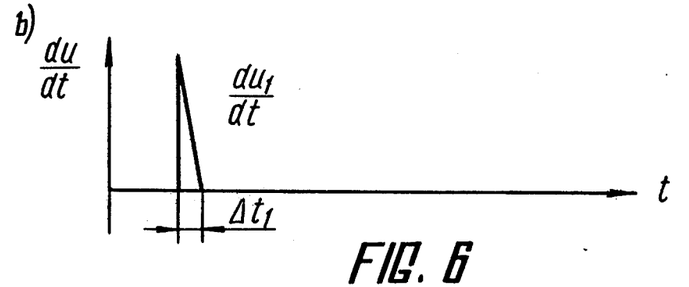
FIG. 6 shows a chart of variations of the time derivative of the voltage of FIG. 5; according to the invention.

A short positive voltage pulse, according to FIG. 6, is produced at the output 56 of the n-th element 53. Said signal is fed to the complementing input 69 of the flip-flop 58 of the electronic switch 52 and it is the second input pulse which sets the flip-flip 58 into another stable condition. In this condition of the flip-flop 58 the signal "I" is produced at its output 71 to be then fed to the input 72 of the AND circuit 60 and the signal "O" is produced at the output 73. The signal "I" at the second input 74 of the second NOT circuit 63 disappears, the switch 52 opens and all electrical pulses supplied from the pulse pickup 43 as the signal "I" pass to the output 77 of the fine length metering unit 42.

Thus, the moment when the electronic switch 52 opens is the beginning of the fine measurement of the pipe 9. From this moment on all electrical pulses corresponding to 1 mm of the pipe 9 are fed as signals "I" to the input of the module 80 (FIG. 4) of the initial data input unit 78 of the computing system 17 (FIG. 2). Said pulses are supplied by the module 80 (FIG. 4) to the input 83 of the working store 85.

Fine measurement of the length of the pipe 9 (FIG. 2) by the device 8 for measuring the real length of a pipe and supply of electrical pulses from the output 76 (FIG. 3) of the pulse pickup 43 to the input of the module 80 (FIG. 4) of the computing system 17 (FIG. 2) continues until the rear butt of the pipe 9 (FIG. 3) opens the first of the photoelectric pickups 45 shut off at the beginning of the fine measurement of its length.

As seen in the concrete example (FIG. 3) the pipe 9 opens the pickup $2^1$.

At this moment the pipe 9 is measured in the following way.

Figure 7:
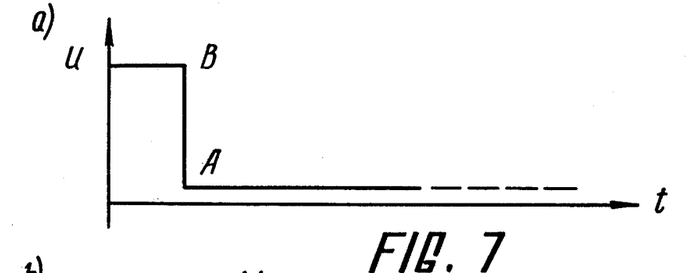
FIG. 7 shows a chart of variations of the voltage of the photoelectric pickup of the pipe length coarse metering unit at the moment, when it is released by the rear butt of the measured pipe, according to the invention.

It is evident that, when any of the n+1 photoelectric pickups 45 is opened, low voltage of great duration appears thereon (FIG. 7, voltage change from the point B to A), and, consequently, a signal is fed from the photoelectric pickup $2^1$ as a low level voltage to the input $2^1$ (FIG. 3) of the element 53 of the differentiating organ 51.

Figure 8:
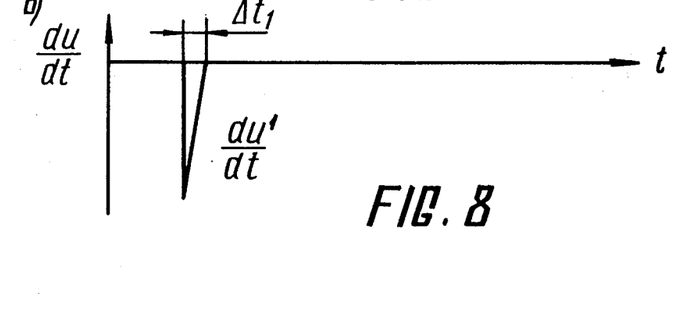
FIG. 8 shows a chart of variations of the time derivative of the voltage of FIG. 7, according to the invention.

At the same time at the output 57 of the differentiating circuit 55 coupled by its input to the photoelectric pickup $2^1$ there appears a voltage as a short pulse of negative polarity, which is the derivative $dU^1/dt$ (FIG. 8, the pulse of negative polarity of duration $\Delta t_1$) of the voltage produced by the photoelectric pickup $2^1$ at the moment it is uncovered by the pipe 9 (FIG. 3). A short pulse of negative polarity is, consequently, fed to the input 65 of the biased flip-flop 59 of the electronic switch 52. The flip-flop 59 is set into its unstable state, and at this moment a short pulse of positive polarity appears as signal "I" at its output. The signal "I" is supplied from the output of the biased flip-flop 59 to the input 66 of the AND circuit 60. At this moment, as previously mentioned, there is already the signal "I" at the second input 72 of the AND circuit 60 fed from the output 71 of the flip-flop 58.

The signal "I" appears, consequently, at the output of the AND circuit 60 to be fed to the input of the inverter 61. The reset signal "O" is fed from the output of the inverter 61 to the input 70 of the flip-flop 58, which resets said flip-flop 58 into the initial position corresponding to the beginning of measurement of the pipe 9.

The signal "O" appears, consequently, at the output 71 of the flip-flop 58 and the signal "I" appears at the output 73. The signal "I" is fed to the input 74 of the second NOT circuit 63 and the inhibitor circuit 64 performs its inhibiting logical operation. The electronic switch 65 is closed and all electrical pulses, which continue being fed from the output 76 of the pulse pickup 43, are prevented from being delivered as the signal "I" to the input of the module 80 (FIG. 4) of the computing system 17 (FIG. 2).

In this way the pipe 9 (FIG. 2) is finely measured by the device 8 for measuring the real length of pipes and the number C of electrical pulses counted by the module 80 (FIG. 4) is supplied to the input 83 of the working store 85.

Hence, as the pipe 9 (FIG. 2) moves along the first live rollers 7 to a distance not exceeding one unit of length, the whole process of measuring is completed by the device 8 for measuring the real length of each pipe supplied from the bunker 5 is completed by the device 8. Such design of the device 8 for measuring the real length of pipes ensures high efficiency, because measurement process lasts over a period of time required for the pipe being measured to move to a distance equal to one unit of length.

The second advantage of said device 8 is its high accuracy, since coarse measurement of the pipe length is done twice and fine measurement consists in measuring a pipe portion not exceeding a distance equal to a unit of length, said short portion being measured with a precision of 1 mm.

The already measured pipe 9 is carried from the device 8 for measuring the real length of pipes to the second live rollers 10. As this takes place, the computing system 17 determines the real length of said pipe 9.

The computing system 17 determines the real length of the pipe 9 as follows.

Data of the coarse measurement of the length of the pipe 9 (FIG. 2) are supplied from the working store 85 (FIG. 4) to the arithmetic unit 92. The initial data on the number $a_1$ and $a_2$ of shut-off photoelectric pickups 45 (FIG. 3) during, respectively, the first and second coarse measurements of the length of the pipe 9 by the measuring device 8 (FIG. 2) are delivered from the output 86 (FIG. 4) of the working store 85 to the input 89 of the arithmetic unit 92.

At the same time, data of the fine measurement of the length of the pipe 9 (FIG. 2) are delivered from the working store 85 (FIG. 4) to the arithmetic unit 92.

The initial data on the number "C" of electrical pulses counted during the fine measurement of the length of the pipe 9 (FIG. 3) by the device 8 (FIG. 2) are delivered from the output 87 of the working store 85 to the input 90 of the arithmetic unit 92.

Commands of said subroutine for determination of the real pipe length are fed from the output of the module 93 (FIG. 4) to the input 99 of the arithmetic unit 92. According to said commands said arithmetic unit 92 at first determines the length of the pipe 9 (FIG. 2) conformably to the results of the coarse measurements.

Here two variants are possible. In the first variant the number $a_1$ of the photoelectric pickups 45 (FIG. 3) shutoff by the pipe 9 in the first coarse measurement of its length is not equal to the number $a_2$ of said photoelectric pickups 45 shut off by said pipe 9 in the second coarse measurement, the number $a_1$ being different from the number $a_2$ by more than one unit of length. This means that the coarse measurement of the length of the pipe 9 (FIG. 2) performed by the measuring device 8 was not correct. This variant is an emergency condition of the automatic line (FIG. 2). Conformably, a command to forbid delivery of the next pipe from the bunker 5 (FIG. 2) is passed from the output 120 (FIG. 4) of the arithmetic unit 92 to the input of the control unit 126. A blocking signal is fed from the output 127 (FIG. 4) of the control unit 126 to the solenoid 18 (FIG. 2), which prevents switching on of the drive 6 for item-by-item delivery of pipes to the measuring device 8 until the fault is corrected.

Provisions made for an emergency condition of the automatic line in case of wrong measurement of the pipe 9 permit elimination of defective products in making pipe strings.

In the second variant the number $a_1$ of the photoelectric pickups 45 (FIG. 3) shut off by the pipe 9 in the first coarse measurement of its length is equal to the number $a_2$ of said pickups 45 shut off by the pipe 9 in the second coarse measurement of its length. The number $a_2$ of the shut-off photoelectric pickups 45 in the second measurement can be more by one unit of length than the number $a_1$ of the photoelectric pickups 45 shut off in the first coarse measurement of the pipe 9.

This variant corresponds to normal operating conditions of the automatic line. In this case the arithmetic unit 92 (FIG. 4) determines that portion of the length of the pipe 9 (FIG. 3) which is divisible by a whole number of units of length.

It is evident that said portion of the length of the pipe 9 being measured expressed in the number "b" of whole units of length is invariably more by one unit than the number $a_2$ of the photoelectric pickups 45 (FIG. 3) shut off by the pipe 9 in the second coarse measurement of its length by the measuring device 8 (FIG. 2).

In the concrete embodiment of the measuring device 8 (FIG. 3) the number "b" expressing the length of the pipe 9 being measured is given in meters.

The length "b" of the pipe 9 (FIG. 3) expressed in meters calculated by the arithmetic unit 92 (FIG. 4) is then summed up with the rest length of said pipe 9 corresponding to the number "c" of electrical pulses counted by the module 80 (FIG. 4) in fine measurement of its length. In the concrete embodiment (FIG. 3) this portion "c" of the length of the measured pipe 9 is expressed in millimeters.

The real length $l_i$ of the measured pipe 9 is, consequently, equal to the sum consisting of the length "b" of said pipe in the coarse measurement of its length and the length "c" in the fine measurement of its length, that is $$L_i = b + c$$

Thus, the arithmetic unit 92 (FIG. 4) of the computing device 17 (FIG. 2) determines the real length of the pipe 9. As this takes place, the already measured pipe 9 is transferred from the first live rollers 7 of the measuring device 8 to the second live rollers 10.

Said pipe 9 reaches the end switch 22 and acts thereon by its forward butt. At this moment the end switch 22 turns on the solenoid 23 of the drive 21 and the pipe 9 is pushed into the storage 11 of pipes for the arbitrary pipe string.

Said pipe 9 rolls down the inclined ramp of the storage 11 to the extended stop 24.

In this way the measured first pipe 9 comes to the storage 11 for the pipes of an arbitrary pipe string of the model II.

The model II of an arbitrary pipe string of length $L_2$ is henceforth not the diagrammatical model II shown in FIG. 1 but a model of an arbitrary pipe string composed of measured pipes kept in the storage 11.

As the pipe 9 is carried from the second live rollers 10 to the storage, the arithmetic unit 92 (FIG. 4) of the computing system 17 (FIG. 2) performs the following operations.

Data on the real length $l_1$ of the first pipe delivered from the bunker 5 (FIG. 2) are supplied from the output 104 (FIG. 4) of the arithmetic unit 92 to the input 108 of the working store 85 of the computing system 17 (FIG. 2). Then the data on the length $l_1$ of the first pipe is passed from the outputs 112, 88 (FIG. 4) of the working store to the input 116 of the arithmetic unit 92 and data on the length $L_1$ of the reference pipe string model is passed respectively to the input 91 of said arithmetic unit 92.

At this moment the arithmetic unit 92 acting on the subroutine recorded in the module 94 sums up the lengths $l_i$ (when $i = 1 - n$) of available pipes into the length $L_2$ of the arbitrary pipe length model II. In conformity with commands coming from the output module 94 (FIG. 4) the arithmetic unit 92 compares the length $l_1$ of the first pipe 9 (FIG. 2) to the length $L_1$ of the reference pipe string model I.

If the length $l_1$ of the first pipe fed to the input 116 of the arithmetic unit 92 (FIG. 4) is less than the length $L_1$ of the reference pipe string model I, a command is passed from the output 120 (FIG. 4) of the arithmetic unit 92 to the input 123 of the control unit 126 to deliver the next (second) pipe from the bunker 5 (FIG. 2).

The second pipe 9 is delivered from the bunker 5 as follows. The signal to turn on the solenoid 18 of the drive 6 for item-by-item pipe delivery is sent from the output 127 (FIG. 4) of the control unit 126 of the computing system 17 (FIG. 2).

When the solenoid 18 is turned on, the drive 6 pushes the second pipe to the first live rollers 7. The second pipe is measured like the first pipe by the device 8 in the manner described above. It reaches the end switch 22 of the live rollers 10 and on its command is pushed by the drive 21 to the storage 11 of measured pipes for the arbitrary pipe string.

The real length $l_2$ of the second pipe is determined by the computing system 17 in the above mentioned manner. Data on the real length $l_2$ of the second pipe, as described above, is fed to the input 116 (FIG. 4) of the arithmetic unit 92. At the same time data on the length $L_1$ of the reference pipe string model I are fed from the output 88 of the working store 85 to the input 91 of the arithmetic unit 92 and data on the real length $l_1$ of the first pipe are fed from the output 112 (FIG. 4) of the working store 85 to the input 116 of the arithmetic unit 92.

With the above mentioned data the arithmetic unit 92 goes on summing up the length $l_i$ of available pipes. In this case the real length $l_2$ of the second pipe is added to the real length $l_1$ of the first pipe, whereas their total length ($l_1 + l_2$) is again compared to the length $L_1$ of the reference pipe string model I.

If the total length ($l_1 + l_2$) of two pipes of the arbitrary pipe string model II is again less that the length $L_1$ of the reference pipe string model I, the data on the length ($l_1 + l_2$) of the arbitrary pipe string are passed to the input 109 (FIG. 4) of the working storage 85 and a next signal to the solenoid 18 of the drive 6 to deliver the next pipe is fed, as mentioned above, from the output 127 of the computing system 17 (FIG. 2).

Thus the above described cylcle: switching on the drive 6 by the computing system 17, delivery of each available pipe from the bunker 5, measuring the real length of each pipe on the device 8, carrying the pipe by the second live rollers 10 and discharge of each pipe by the drive 21 to the storage 11 is repeated by the automatic line (FIG. 2) until the sum of real lengths $$\sum_{i=1}^{n} l_i$$

of the pipes of the arbitrary pipe string model II is over the length $L_1$ of the reference pipe string model I.

The condition, wherein the length $$\sum_{i=1}^{n} l_i$$

of the arbitrary pipe string model II is over the length $L_1$ of the reference pipe string model I, is registered in the arithmetic unit 92 (FIG. 4) of the computing system 17 (FIG. 2).

The delivery of pipes from the bunker 5 is then stopped and the arithmetic unit 92 (FIG. 4) of the computing system 17 (FIG. 2) starts calculating a model of a pipe string to be made.

The model of a pipe string to be made is calculated by the computing system 17 (FIG. 2) as follows.

When the information that the total length $$\sum_{i=1}^{n} l_i$$

of the model II is longer than the length $L_1$ of the model I of the reference pipe string is supplied from the output 113 (FIG. 4) of the working store 85 to the input 117 of the arithmetic unit 92, said arithmetic unit 92 receives information on the intial data ($L_1$; $l_j$; $\Delta_j$) of the model I of the reference pipe string. At the same time said arithmetic unit 92 turns to the subroutine of the module 95, according to which intervals of possible shifts of each joint of the arbitrary pipe string model II are calculated with respect to the reference pipe string model I within the limits of their excess length.

Intervals of possible shifts of said arbitrary pipe string model II with respect to the reference pipe string model I are calculated as follows.

Signals of the subroutine of the module 95 (FIG. 4) of the working storage 98 are fed to the input 101 of the arithmetic unit 92 to perform the following operations.

At first the arithmetic unit 92 determines the first portion of the length $L_1$ of the reference pipe string model I exceeding the length $l_1$ of the first pipe. The first portion of the length $L_1$ of the reference pipe string model I is composed of lengths of said pairs, each of them comprises said zone $l_j$ permitting location of a joint and said zone $\Delta_j$ forbidding location of such joint.

The arithmetic unit 92 selects, consequently, from the combination of lengths $l_j$ and $\Delta_j$ of the model I the first portion of length $$\sum_{i=1}^{n} l_j + \Delta_j$$

exceeding the length $l_1$ of the first pipe of the arbitrary pipe string.

In the concrete embodiment of FIG. 1 the first portion of the reference pipe string model I is the portion composed of four zones $l_j$ (unhatched sections) permitting location of the joint of the first pipe and three zones $\Delta_j$ (hatched sections) forbidding location of said joint. Then the arithmetic unit 92 (FIG. 4) calculates the first interval of possible shift of said first pipe of length $l_1$ with respect to said first portion of the reference pipe string model I of length $$\sum_{I=1}^{n} l_j + \Delta_j.$$

In this case, if the joint of the first pipe falls in the forbidden zone $\Delta_j$, at first the calculation is done of the length $x_1$ (FIG. 4) of the portion of the first pipe to which its joint is to be shifted to such position with respect to the first portion of the model I of length $$\sum_{i=1}^{n} l_j + \Delta_j$$

in which said joint comes to the beginning of the zone $l_j$ permitting its location.

The arithmetic unit 92 then calculates the length $x_2$ of such portion of the first pipe, to which its joint can be shifted further until said joint reaches the nearest forbidden zone $\Delta_j$. The value of $x_1$ and $x_2$ to which said joint is shifted cannot be more that the total excess of the length of the model II over the length of the model I.

In this way the first interval of length from $x_1$ to $x_2$ of the portion of the first pipe, e.g. of the length $l_1$, to which its joint 1 can be shifted, is determined.

Referring to FIG. 1, there are several intervals to which the joint 1 of the first pipe, for example of length $l_1$, can be shifted and, consequently, the arithmetic unit 92 (FIG. 4) calculates all possible shift ranges $x_1$, $x_2$, etc, which are j in number, for the first pipe of length $l_1$.

Determination of possible shift ranges $x_1$, $x_2$, etc, which are j in number, for the joint of said second pipe of length $l_2$ is performed by the arithmetic unit in the above described manner.

Completion of the subroutine recorded in the module 95 thus implies that the arithmetic unit 92 calculates intervals $x_1$, $x_2$ of possible shifts of each i-th joint of the arbitrary pipe string model II with respect to the reference pipe string model I within the mutual difference of their lengths.

These intervals are formed by the arithmetic unit 92 into an array ($x_1$;$x_2$)ji, where $x_{1ji}$ is the beginning of j-th shift of i-th joint;

$x_{2ji}$ is the end of j-th shift of i-th joint.

Information on the array ($x_1$;$x_2$)ji is fed from the output 106 of the arithmetic unit 92 to the input 110 of the working store 85.

When calculation of shift intervals of each i-th joint of the arbitrary pipe string model II with respect to the reference pipe string model I is completed, the results of this calculation of intervals of shifts of each i-th joint of said model II with respect to model I are supplied from the output 114 of the working store 85 to the input 118 of the arithmetic unit 92 as the array $(X_1;X_2)ji$.

At the same time the arithmetic unit turns to the subroutine recorded in the module 96, which serves to calculate intervals of possible shifts of all i-th joints of the arbitrary pipe string model II with respect to the reference pipe string model I within the limits of their length difference.

Calculation of intervals of possible shifts of all i-th joints of the arbitrary pipe string model II with respect to the reference pipe string model I is performed by the arithmetic unit 92 of the computing system 17 (FIG. 2) as follows.

On the basis of information on all j-th intervals $X_1;X_2$ of shifts of each joint i of the arbitrary pipe string model II with respect to the reference pipe string model I the arithmetic unit 92 (FIG. 4) calculates interval lengths of such portions, which are equal to simultaneous shifts of all joints of said arbitrary pipe string model II with respect to the reference pipe string model I.

Referring to FIG. 1, one of such portions is the portion VI, its length being equal to shifts of all joints 1, 2, 3, 4 of the arbitrary pipe string model II with respect to the reference pipe string model I.

It is evident that there can be many portions such as said portion VI, whose length is equal to the length of shifts of all joints 1, 2, 3, 4 of the arbitrary pipe string model II with respect to the reference pipe string model I.

The arithmetic unit 92 (FIG. 4) hence calculates a plurality of possible intervals, which are lengths of portions to which all i-th joints of the model II can be shifted with respect ot model I, providing said i-th joints are off the zones $\Delta_j$ forbidding location of such joints. Mathematically this operation consists in that the arithmetic unit 92 brings the results of the array $(X_1;X_2)ji$ together into the resulting array $(minX_1 maxX_2)j$, where $minX_1$ is the length of the portion which is the value of the minimum shift of the arbitrary pipe string model II with respect to the model I, wherein all i-th joints of the model II lie off the forbidden zones of the model I.

$max X_2$ is the length of a portion, which is the value of the maximum shift of the arbitrary pipe string model II with respect to the model I, wherein all i-th joints of the model II lie off the forbidden zones of the model I.

j is the number of possible intervals, wherein all joints of the arbitrary pipe string model II lie off the forbidden zones of the reference pipe string model I.

The result of the array $(minX_1; maxX_2)j$ are supplied from the output 107 of the arithmetic unit 92 to the input 111 of the working storage 85.

In this way the arithmetic unit 92 of the computing system 17 (FIG. 2) determines all possible variants of mutual arrangement of the arbitrary pipe string model II with respect to the reference pipe string model I, wherein all joints of the model II lie off the forbidden zones of the model I.

Information on all variants of shifting the model II with respect to the model I is thereafter supplied from the output 115 (FIG. 4) of the working store 85 to the input 119 of the arithmetic unit 92 as the array $(min X_1; max X_2)j$.

At the same time commands are fed from the output of the module 97 of the permanent store 98 to the input 103 of the arithmetic unit 92, which serve to calculate such value of the shift of the arbitrary pipe string model II with respect to the reference pipe string model I that corresponds to the optimal mutual arrangement of models on the basis of economic use of available pipes.

In other words, the arithmetic unit 92 determines the value X of mutual model shift, where extra portions of length of the arbitrary pipe string model II are brought down to minimum or can be used again to make next pipe strings.

The concrete embodiment of FIG. 1 demonstrates a variant II-3, wherein such portion X of optimal shift of the arbitrary pipe string model II with respect to the reference pipe string model I corresponds to the portion IX. Besides, in this variant II-3 the first pipe is not included into the pipe string IV.

This means that in determination of the value X of optimal shift of the arbitrary pipe string model II with respect to the reference pipe string model I by the computing system 17 (FIG. 2) the following variations are possible in the operation of the automatic line.

In the first variant the first pipe in the arbitrary pipe string model II becomes unnecessary after determination of the value X of optimal shift of the model II with respect to the model I by the computing system 17 (FIG. 2). The command to discharge the first pipe is supplied in this case from the output 121 (FIG. 4) of the arithmetic unit 92 to the input 124 of the control unit 126. Then a signal to turn on the solenoid 27 is supplied from the output 128 of the control unit 126 of the computing system 17 (FIG. 2) and the drive 26 pushes the first pipe from the storage 11 to the bunker 28.

This pipe can be later used to make other pipe strings.

In the second variant the value of the shift of the model II with respect to the model I calculated by the computing system 17 does not satisfy the condition of economic use of pipes. In this variant, like in the first one, the signal to turn on the drive 26 is suppled from the output of the computing system 17 and said drive pushes the first pipe from the storage 11 into the bunker 28.

At the same time the command to deliver a next pipe from the bunker 5 (FIG. 2) is fed from the output 120 (FIG. 4) of the arithmetic unit 92 to the input 123 of the control unit 126. The signal to turn on the solenoid 18 (FIG. 2) of the drive 6, which pushes the next pipe to the first live rollers 7 of the measuring device 8, is passed from the output 127 (FIG. 4) of the control unit 126. The automatic line then performs all above described operations to calculate the value X of the optimal shift of another model II of the arbitrary pipe string with respect to the reference pipe string model I.

In the third variant the value X of the optimal shift of the arbitrary pipe string model II with respect to the reference pipe string model I is determined by the computing system 17 at once. In this case the command to move the stop 33 (FIG. 2) of the pipe cutter 15 is passed from the output 122 (FIG. 4) of the arithmetic unit 92 to the input 125 of the control unit 126.

A signal (as a coordinate for movement recorded on the perforated tape) is then supplied from the output 129 (FIG. 4) of the control unit 126 of the computing system 17 (FIG. 2) to the input of the programme control unit 35 for setting the stop 33.

According to the signals of the programme control unit 35 the stop 33 with the end switch 34 moves by means of the step-by-step motor 36 and the guide screw 37 from the axis of the cutting tool of the pipe cutter 15 to a distance equal to the value X of the optimal shift of the arbitrary pipe string model II with respect to the reference pipe string model I.

When the stop is moved to the assigned coordinate X, a short signal is delivered from the programme control unit 35 to turn on the third and the fourth live rollers 12, 13 and the solenoid 25.

When the solenoid 25 is switched on for a short period the stop 24 is removed and the first pipe 9 of the arbitrary pipe string rolls down from the storage 11 to the third live rollers 12.

The pipe then is transferred from the third live rollers 12 to the fourth live rollers 13. At the moment when the first pipe 9 releases by its rear butt the end switch 29, the command of said switch 29 again turns on the solenoid 25 for a short time, the stop 24 is removed and the second pipe of the arbitrary pipe string rolls down from the storage 11 to the third live rollers 12. At this moment the first pipe carried by the fourth live rollers 13 enters the clamping centering device 31 of the welding machine 30 and its rear butt is placed in the position required for welding. The second pipe following the first one enters the clamping centering device 31 by its forward butt and is also placed in the position required for butt welding of pipes. After the first two pipes of the arbitrary pipe string are centered, the signal of the centering device stops the fourth live rollers 13 and the welding machine 30 is switched on to perform butt welding of the first two pipes of the arbitrary pipe string.

When the second pipe of the arbitrary pipe string releases the end switch 29, its signal turns on the solenoid 25 for a short time, the stop 24 is removed and the third pipe rolls down from the storage 11 to the third live rollers 12.

When the automatic cycle of welding of the first two pipes is completed, the command of the welding machine switches on the fourth live rollers 13. The pipe string welded of two pipes is carried further in the direction of the pipe cutter 15. As soon as the end of the pipe string composed of two pipes enters the centering device, its rear butt is placed in the position required for welding. At the same time the third pipe is passed from the third live rollers 12 to the fourth live rollers 13 and further on to the centering device 31 of the welding machine 30.

In this manner the above described cycles of delivery of available pipes from the storage 11 and welding of said pipes into a pipe string are repeated until all pipes available in the storage 11 are welded into a pipe string.

In the process of welding the pipes into a string, said string carried along the fourth live rollers 13 approaches the pipe cutter 15 and acts on the end switch 34 by its forward butt. The command of the end switch 34 stops the fourth live rollers 13 and turns on the pipe cutter 15, which cuts off the excess portion of the pipe string equal to the value X of the optimal shift of the arbitrary pipe string model II with respect to the reference pipe string model I. When the portion X of the arbitrary pipe string is cut off, the command of the pipe cutter 15 turns on the fourth live rollers 13 and the pipe string is carried to the end switch 40. When the pipe string acts on the end switch 40, the fourth live rollers 13 are stopped and the pipe cutter 15 is turned on, which cuts off a portion of the arbitrary pipe string equal to $L_1$, that is the length of the pipe string to be made.

When the pipe string is cut off, the commands of the end switch 40 (acted upon by the forward butt) and the pipe cutter 15 (end of pipe cutting cycle) coincide and the solenoid 39 of the drive 38 is switched on and the ready pipe string is discharged into the storage 16.

What is claimed is:

1. A method of making a pipe string from separate pipes of nonuniform length comprising the following operations:

preparing a first pipe string model representative of a reference pipe string and having a length corresponding to a predetermined length of a pipe string to be made;

indicating along the length of said first pipe string model zone where the location of joints is forbidden;

measuring the actual length of available pipes in a predetermined sequence;

preparing another pipe string model of an arbitrary pipe string from the measured actual lengths of the available pipes;

determining the length of said first and said another pipe string model and determining the amount by which the length of said another pipe string model exceeds the length of said first pipe string model;

marking on said another pipe string model the locations of joints of said available pipes;

comparing the location of joints marked on said another pipe string model with the location of forbidden zones indicated on said first pipe string model, all joints marked on said another pipe string model being projected onto said first pipe string model;

identifying joints marked on said another model which fall in said forbidden zones marked on said first model;

shifting said first and another models with respect to each other within the limits of the excess in length of said another pipe string model over said length of first pipe string model until a mutual arrangement of said models of pipe strings is found in which all joints marked on said another model are off the forbidden zones indicated on said first model;

shifting said first and another model with respect to each other within the limits of the difference of their lengths to identify other possible mutual arrangements of said pipe string models where all joints marked on said another model are off the forbidden zones indicated on said first model;

selecting an optimal arrangement from said possible mutual arrangements of said pipe string models which satisfies the most rational variant of use of said pipes, the selected optimal mutual arrangement of said pipe string models including a portion, equal in length to said first pipe string model, which becomes the model of the pipe string to be made;

butt welding said pipes into a string corresponding to said model of the pipe string to be made; and cutting off excess portions of said pipe string in accordance with said model of the pipe string to be made thereby obtaining the desired pipe string.

2. An automatic line for making pipe strings of required length from pipes of nonuniform length comprising the following components sequentially arranged according to a production process:

a first bunker for receiving available pipes and having first actuatable roller means for item-by-item delivery of received pipes;

a device for measuring the real length of available pipes delivered from said first bunker by said first actuatable roller means;

storage means for storing measured pipes to form an arbitrary pipe string and including drive means for discharging unused pipes;

second roller means for delivering measured pipes from said measuring device to said storage means for measured pipes, said second roller means including switch means for sensing a measured pipe and drive means responsive to said switch means for delivering a measured pipe to said storage means;

a second bunker for storing unused measured pipes positioned in the vicinity of said storage means;

third roller means positioned between said storage means for storing measured pipes and said second bunker for unused measured pipes for transferring measured pipes between said storage means and said second bunker;

fourth roller means positioned successively in the direction of pipe movement after said third roller means for discharging a ready pipe string of required length, said fourth roller means including switch means for sensing a pipe string and drive means for discharging the ready pipe string;

a welding apparatus for welding said measured pipes into an arbitrary pipe string;

an actuatable movable pipe cutter for cutting off excess portions of said arbitrary pipe string and thus obtaining the ready pipe string of required length, said pipe cutter including moving means for adjusting its position and means actuated by said switch means of said fourth roller means for cutting off excess portions of said arbitrary pipe string;

computing system means for calculating models of the pipe string to be made, and having inputs connected to said device for measuring the real length of said available pipes and outputs connected respectively:

one of said first actuable roller means for item-by-item pipe delivery of received pipes from said bunker for receiving available pipes, a second to said drive means of said storage means for storing measured pipes of the arbitrary pipe string, a third to said moving means of said actuatable movable pipe cutter; and storage means for storing ready pipe strings.

3. A method as claimed in claim 1 wherein the length of said first pipe string model is directly proportional to the predetermined length of the pipe string to be made and wherein said first pipe string model is executed in a scale convenient for handling.

* * * * *